(12) United States Patent
Ohba et al.

(10) Patent No.: US 6,428,415 B1
(45) Date of Patent: Aug. 6, 2002

(54) ELECTRONIC EQUIPMENT, AUXILIARY INFORMATION DISPLAY DEVICE, AND PORTABLE GAME MACHINE

(75) Inventors: Akio Ohba; Masaaki Oka, both of Kanagawa; Nobuo Sasaki, Kanagawa-ken; Sachiyo Aoki, Tokyo, all of (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/409,474

(22) Filed: Oct. 6, 1999

(30) Foreign Application Priority Data

Oct. 8, 1998 (JP) .......................... 10-286882

(51) Int. Cl.[7] .............................. A63F 13/06
(52) U.S. Cl. ........................................ 463/31
(58) Field of Search .................. 463/31, 33, 40, 463/44, 47; 352/129; 273/148 B

(56) References Cited

U.S. PATENT DOCUMENTS

| | | | | |
|---|---|---|---|---|
| 4,359,222 A | * | 11/1982 | Smith, III et al. | 273/85 |
| 4,589,660 A | * | 5/1986 | Tsuzuki | 273/1 |
| 5,265,889 A | * | 11/1993 | Kojima | 273/442 |
| 5,550,564 A | | 8/1996 | Cragun | |
| 5,631,805 A | * | 5/1997 | Bonsall | 361/681 |
| 5,870,156 A | * | 2/1999 | Heembrock | 349/64 |
| 5,929,952 A | * | 7/1999 | Bartha | 349/65 |

FOREIGN PATENT DOCUMENTS

| | | |
|---|---|---|
| EP | 0 414 566 | 2/1991 |
| FR | 2 687 241 | 8/1993 |
| JP | 5-210355 | 8/1993 |

* cited by examiner

Primary Examiner—Mark Sager
Assistant Examiner—Steven L Ashburn
(74) Attorney, Agent, or Firm—Katten Muchin Zavis Rosenman

(57) ABSTRACT

A portable game machine 60 includes a detachable transparent film 62, a base film 63, and reels 64a, 64b, and a reflective liquid crystal panel 8 which is sandwiched in between, with the transparent film 62 in front of, and the base film 63 in back of the reflective liquid crystal panel, which is supported in a housing 4 to display images. In the portable game machine 60, menu options, icons, and other auxiliary information is depicted on the transparent film and the base film, etc. By manipulation of an operation unit, instructions are given by moving an arrow, etc. displayed on the reflective liquid crystal panel 6. Auxiliary information corresponding to multiple scenes is depicted on the transparent film 62 and the base film 63, and the auxiliary information that is displayed in a display unit 61 is changed by rotating the reels 64a, 64b to scroll the transparent film 61 and the base film 63.

20 Claims, 7 Drawing Sheets

ELECTRONIC EQUIPMENT, AUXILIARY INFORMATION DISPLAY DEVICE, AND PORTABLE GAME MACHINE

BACKGROUND OF THE INVENTION

1. Field of the Invention

This invention relates to electronic equipment to which is attached for display a mechanism on which auxiliary information is depicted, and an auxiliary information display device which is attached to the electronic equipment. More specifically, the present invention relates to electronic equipment that is well suited for a portable information communication terminal having a low-resolution display unit, an auxiliary information display device attached to the electronic equipment, and a portable game machine.

2. Description of the Prior Art

Every portable information communication terminal or a small portable game machine can operate independently by itself and can execute applications software such as programs for various data processing and game programs. A portable information communication terminal or small portable game machine, besides being used as an auxiliary computation and memory resource connected to various consoles in which the home-use console of a personal computer or video game machine serves as the parent machine, can communicate with external devices through its wireless communication functions or other communication functions.

A conventional portable information communication terminal or a small portable game machine has as its display unit a liquid crystal display, for example. However, a conventional portable information communication terminal or small portable game machine can have as its display unit only a small, low-resolution liquid crystal display, such as one of 32-by-32-dot size, and it has been difficult to display auxiliary information that requires a high-resolution display unit, such as menus, icons, or other marks.

In order to display such auxiliary information it has been necessary, in a conventional portable information communication terminal or a small portable game machine, to incorporate predetermined pictures into a liquid crystal. Such a technique lacks generality and has been an impediment to replacing and executing various applications software.

In a conventional portable information communication terminal or small portable game machine, auxiliary information of sufficient generality for various types of applications software has sometimes been written directly into a liquid crystal peripheral unit. Even in such cases it has been difficult to handle a wide variety of applications software.

SUMMARY OF INVENTION

It is an object of this invention, which was devised in consideration of the aforementioned problems, to provide electronic equipment that can do data processing and to which a mechanism to make an auxiliary display of icons or other marks is attached, and an auxiliary information display device to be attached to the electronic equipment.

To obtain the above and other objects the electronic equipment of this invention comprises a display means to display information, an auxiliary information display means on which information that is auxiliary to the information displayed on the display means is depicted on a substrate, and a display window on which are simultaneously displayed, in a superimposed state, the information displayed by the display means and the auxiliary information that is displayed on the auxiliary information display means. The auxiliary information display means has a movable substrate on which at least auxiliary information is depicted.

In the electronic equipment of this invention composed as described above, besides the information displayed on the display means, auxiliary information is displayed on the display window.

Also, the auxiliary information display device of this invention is characterized in that it is positioned inside the display window of the electronic equipment, it has an auxiliary information display layer in which auxiliary information of the information displayed on the display means of the electronic equipment is depicted on a substrate, and at least the auxiliary information display layer is movable.

In the auxiliary information display device of this invention composed as described above, besides the information that is displayed by the display means of the electronic equipment, auxiliary information is displayed in the display window of the electronic equipment.

The portable game machine of this invention is a portable game machine comprising a display means that displays the game content, and an auxiliary information display means is provided on the front, back, or both the front and back of said display means, and the image displayed on said display means and the displayed content of said auxiliary information display means are combined and made visible. The display means consists of, for example, a reflective liquid crystal panel. For example, said display means may display mostly characters, while said auxiliary information display means may display, for example, either menus, icons, or background scenes.

In such a portable game machine, even if a low-resolution display means is used, information necessary for the game can be provided to game players by composing high-resolution auxiliary information with it.

By making it replaceable and movable, the auxiliary information display means is able to combine various kinds of auxiliary information according to the game content displayed on the display means.

DETAILED DESCRIPTION OF THE PREFERRED EMBODIMENTS

Embodiments to which the present invention is applied will hereinafter be described in detail with reference to the accompanying drawings.

First Embodiment

Figure 1:
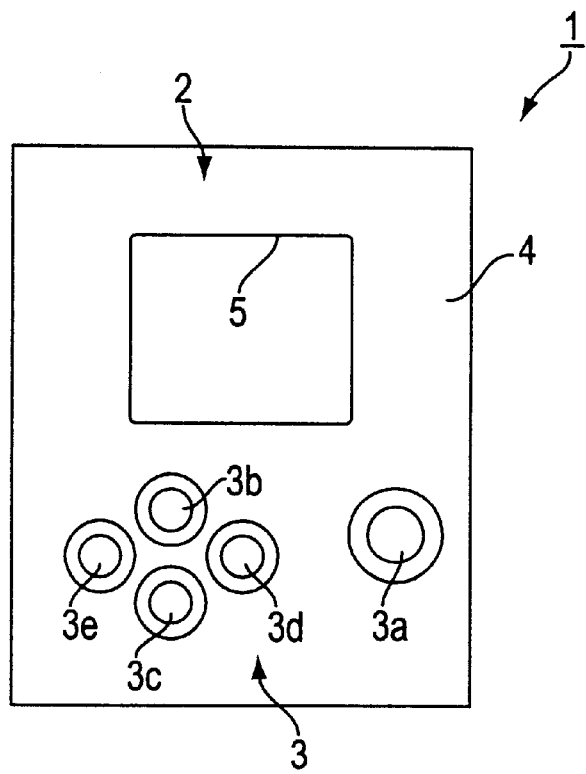
FIG. 1 is a front view of a portable game machine according to the first embodiment of the invention.

A portable game machine 1 shown in FIG. 1 of the first embodiment of this invention includes a CPU, a wireless communication block and nonvolatile memory, etc., which are not shown, and it is composed as a portable information communication terminal (PDA: personal digital assistant) that can transmit and receive data with external equipment via wireless communication functions and execute various applications software. Portable game machine 1, which looks as shown in FIG. 1, includes for example, a display unit 2, which has, for example, a reflective liquid crystal panel 6 etc., which is described below, and an operation unit 3 for various information input, and these parts are accommodated in a housing 4. Housing 4 is perforated by a display window 5. Portable game machine 1 has inside housing 4 a CPU as well as a wireless communication block and nonvolatile memory, etc., which are not shown.

Figure 2:
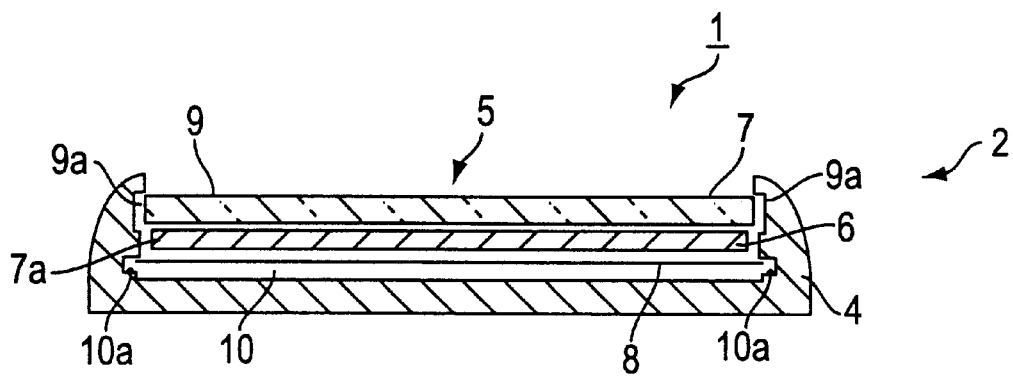
FIG. 2 is a cross-sectional view showing the composition of the display unit of the portable game machine.

As shown in FIG. 2, display unit 2 has reflective liquid crystal panel 6, which is a display means that displays image data, etc., a transparent panel 7, which is the substrate of an auxiliary information display means, and a base panel 8, etc., and these parts are positioned in display window 5.

Reflective liquid crystal panel 6 has the function of displaying various information; for example, it displays image data for game characters, etc. This reflective liquid crystal panel 6 has, for example, a 32-by-32-dot display screen. Reflective liquid crystal panel 6 is deployed with its legs supported by housing 4.

Transparent panel 7 is made of, for example, a rigid acrylic panel, and the user is able to see various data displayed on reflective liquid crystal panel 6 through this transparent panel 7. Depicted on transparent panel 7, for example by printing, is auxiliary information 7a to supplement the information displayed on reflective liquid crystal panel 6. Transparent panel 7 is inserted, by being slid along guide grooves 9a, into a gap 9, which is formed by housing 4, and this configuration allows it to be attached and detached in portable game machine 1. Transparent panel 7, by being positioned in this way in front of reflective liquid crystal panel 6, also has the function of protecting the display screen of reflective liquid crystal panel 6.

A base panel 8 reflects the light that comes in from outside and has a near-white color such as silver that reflects light. Reflective liquid crystal panel 6 can display various image data, etc. by modulating the intensity of the light from this base panel 8. Base panel 8 is inserted by being slid along guide grooves 10a of a gap 10, which is formed by housing 4. This composition allows base panel 8 to be attached and detached in portable game machine 1.

An operation unit 3 has one or more operation elements 3a through 3e and performs event input and various information selection, etc.

Figure 3:
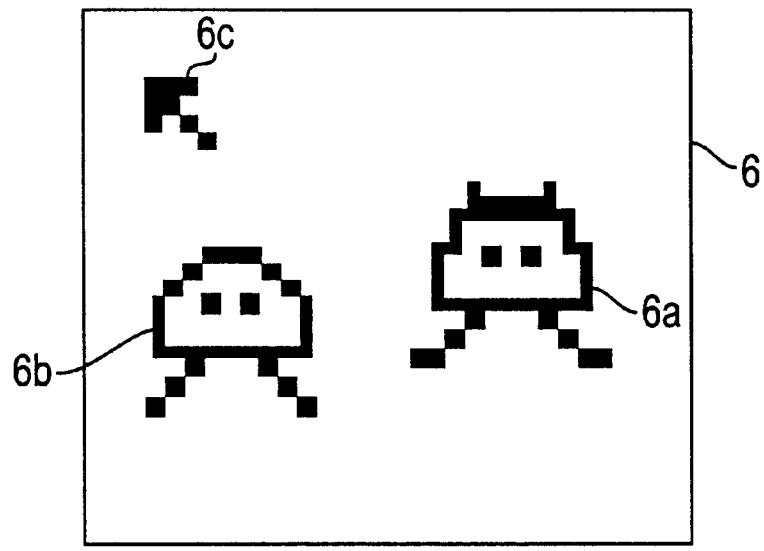
FIG. 3 is an explanatory diagram showing an example of an image displayed on the reflective liquid crystal panel of the portable game machine.

In portable game machine 1 having the above-described configuration, a description is given for the case in which a game is executed in which appear characters 6a and 6b as shown in FIG. 3.

Figure 4:
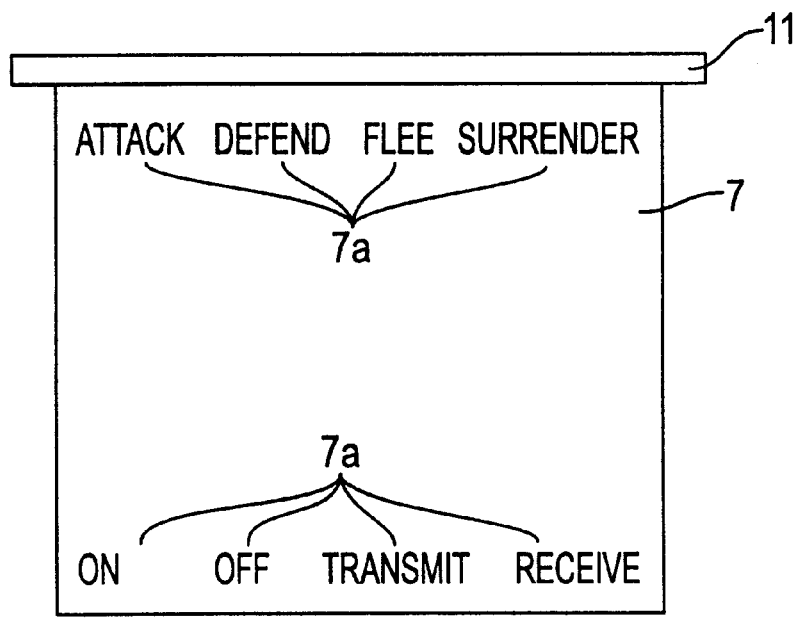
FIG. 4 is an explanatory diagram showing an example of the auxiliary information depicted on the transparent panel of the portable game machine.
Figure 5:
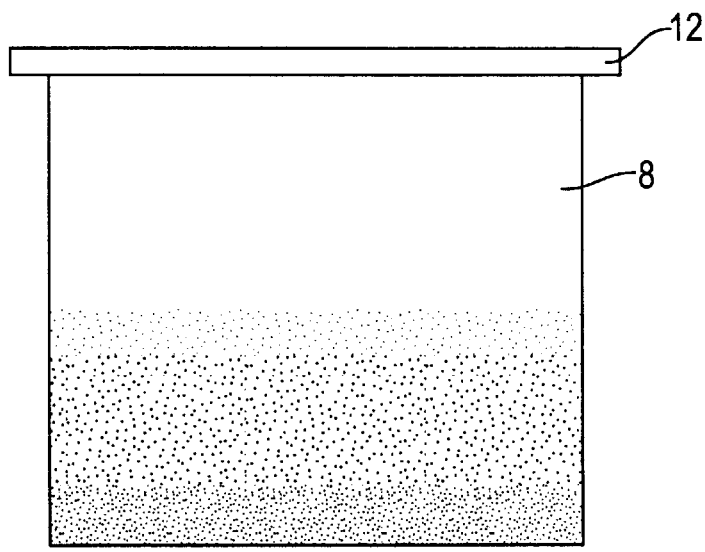
FIG. 5 is an explanatory diagram showing an example of a picture of the scene depicted in the base panel of the portable game machine.

As shown in FIG. 3, in portable game machine 1, reflective liquid crystal panel 6 displays characters 6a and 6b, and arrow 6c, which indicates auxiliary information 7a such as menus for giving instructions about the actions, etc. of these characters 6a and 6b. In portable game machine 1, reflective liquid crystal panel 6 does not have enough resolution to display auxiliary information 7a, so, as shown in FIG. 4, auxiliary information 7a such as menu selections "Attack" and "Defend" is pre-depicted on transparent panel 7, and when the game is to be played, this transparent panel is slid into gap 9 in housing 4 and is attached. Transparent panel 7 is provided with handle 11 on its top to make it easy to put it into and remove it from portable game machine 1. In portable game machine 1, as shown in FIG. 5, auxiliary information such as background pictures and menu items are depicted on base panel 8 as necessary. This base panel 8 is equipped with handle 12 for insertion into gap 10 in housing 4, similarly to transparent panel 7.

Figure 6:
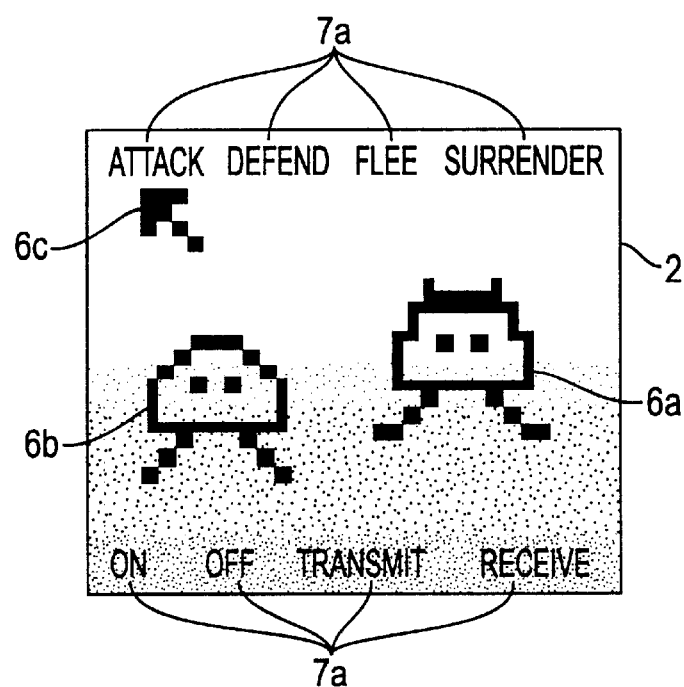
FIG. 6 is an explanatory diagram showing an example of a scene shown by the display unit of the portable game machine.

Thus a scene displayed in display unit 2 composed by superimposing reflective liquid crystal panel 6, transparent panel 7, and base panel 8 in display window 5 appears as shown in FIG. 6, making it possible to display more information in portable game machine 1 than is displayed by the image in reflective liquid crystal panel 6 as shown in FIG. 3. In portable game machine 1, by manipulating operation unit 3, the user moves arrow 6c displayed by reflective liquid crystal panel 6 and selects auxiliary information 7a, such as menu options, depicted on transparent panel 7.

In this way, even if the display screen of reflective liquid crystal panel 6, which is the display means, in portable game machine 1 is small and of low resolution, a large amount of information can be displayed by attaching base panel 8 and transparent panel 7, on which is depicted auxiliary information 7a such as menu options and icons. And because transparent panel 7 and base panel 8 can be easily attached and detached, they can be used in portable game machine 1 by simply attaching or detaching them in accordance with the applications software that is to be used. A variety of scenes can be built up in portable game machine 1, even within the same applications software, by replacing transparent panel 7 of base panel 8, etc.

Another configuration of the above portable game machine will be described with reference to FIG. 7.

Second Embodiment

Figure 7:
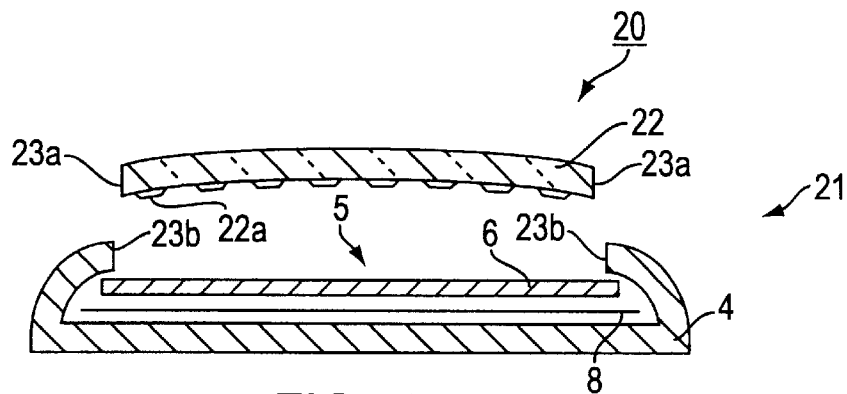
FIG. 7 is a cross-sectional view of the display unit in a portable game machine according to a second embodiment of the invention.

Portable game machine 20 shown in FIG. 7 as the second embodiment has its basic composition the same as that of portable game machine 1 shown in FIGS. 1 through 6, and is characterized in that a transparent panel is directly attached to its display window. Therefore the same symbols are used for the same configuration as in portable game machine 1 shown above in FIGS. 1 through 6, and a detailed explanation thereof is omitted.

As shown in FIG. 7, portable game machine 20 has a display unit 21 consisting of reflective liquid crystal panel 6, which is a display means, base panel 8, and a transparent panel 22, which is the substrate of the auxiliary information display means and consists of a panel or other rigid body made of, for example, acrylic, which are positioned in display window 5.

Transparent panel 22 has fitting parts 23a which are constituted so as to fit together with fitting parts 23b provided on housing 4 in a condition that the panel fits the shape of the outer frame of display window 5. Constructed as it is, transparent panel 22 is freely attachable to and detachable from portable game machine 20, and has the role of protecting the display screen of reflective liquid crystal panel 6. In portable game machine 20, base panel 8, like reflective liquid crystal panel 6, may be preset in housing 4, and may be constructed so as to be detachable as described in the first embodiment.

In portable game machine 20, as described in the first embodiment, menu options, icons, or other auxiliary information 22a is depicted on transparent panel 22, and by manipulating operation unit 3, arrow 6c, etc. displayed on reflective liquid crystal panel 6 is moved to indicate auxiliary information 22a, as shown in FIG. 3 above. Here, background pictures or auxiliary information may also be depicted on base panel 8 as necessary.

Thus a large amount of information can be displayed in portable game machine 20 since auxiliary information such as menu options and icons as well as the images displayed by reflective liquid crystal panel 6 can be displayed on display unit 21. And because transparent panel 22 is easily detachable, these parts can be simply detached and attached in accordance with the applications software used in portable game machine 20. And a variety of scenes can be put together in portable game machine 20 by replacing transparent panel 22, etc., even within the same applications software.

Further another embodiment of the above portable game machine will be described in detail with reference to FIG. 8.

Third Embodiment

Figure 8:
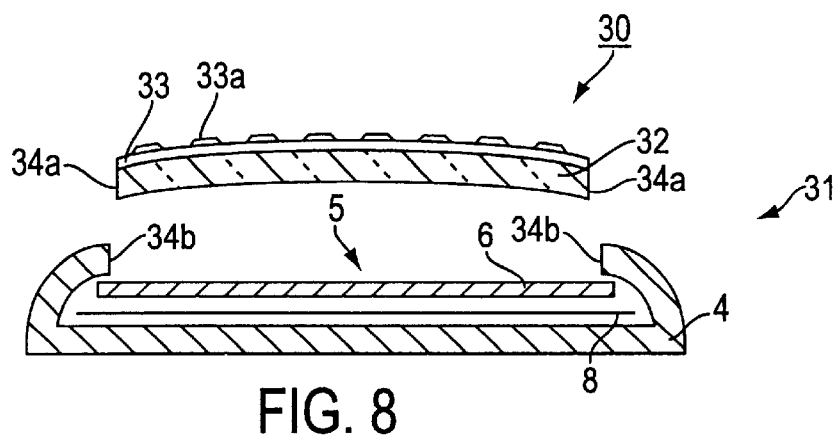
FIG. 8 is a cross-sectional view of the display unit in a portable game machine that is shown as a third embodiment of the invention.

A portable game machine 30 shown in FIG. 8 as the third embodiment has in its basic configuration the same as that of portable game machine 20 shown in FIG. 7, and is characterized in that it has affixed to the transparent panel a transparent seal consisting of a flexible sheet. Therefore the same symbols are used for the same composition as in portable game machine 20 shown above in FIG. 7, and a detailed explanation thereof is omitted.

As shown in FIG. 8, portable game machine 30 has a display unit 31 consisting of reflective liquid crystal panel 6, which is a display means, base panel 8, a transparent panel 32, which consists of a panel or other rigid body made of, for example, acrylic, and a transparent seal 33, which consists of a flexible sheet made of, for example, vinyl chloride, which are positioned in display window 5.

Transparent panel 32 has fitting parts 34a which are constituted so as to fit together with fitting parts 34b provided on housing 4 in a condition that the panel fits the shape of the outer frame of display window 5. Constructed as it is, transparent panel 32 is freely attachable to and detachable from portable game machine 30, and has the role of protecting the display screen of reflective liquid crystal panel 6. In portable game machine 30, transparent panel 32 may be preset in housing 4 to be positioned in display window 5, and may be constructed so as to be detachable as described in the first embodiment. Also, base panel 8, like reflective liquid crystal panel 6, may be preset in housing 4, and may be constructed so as to be detachable as described in the first embodiment.

In portable game machine 30, transparent seal 33, which is used attached directly to the entire surface or part of the surface of transparent panel 32 and is given a special surface treatment so that it can be affixed on and peeled off any number of times, and the seal 33 has the function of protecting transparent panel 32. Auxiliary information 33a such as menu options and icons is depicted on transparent seal 33, and in portable game machine 30, by manipulating operation unit 3, arrow 6c, etc. displayed on reflective liquid crystal panel 6 is moved to indicate auxiliary information 33a, as shown in FIG. 3 above. Here, background pictures or auxiliary information may also be depicted on transparent panel 32 or base panel 8 as necessary.

Figure 9:
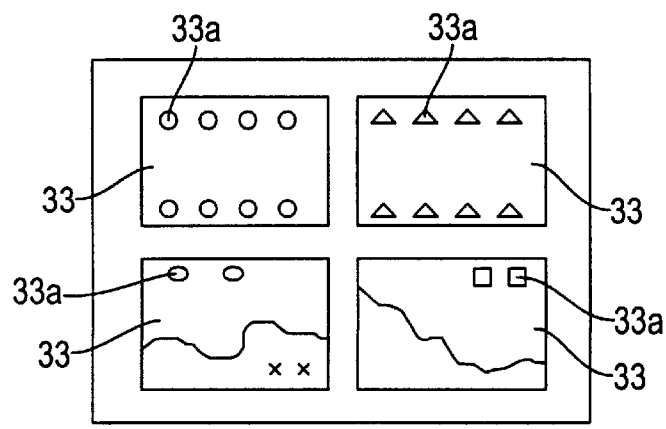
FIG. 9 is an explanatory diagram showing an example of the transparent seal used in the portable game machine.

As shown in FIG. 9, transparent seal 33 that is thus used is prepared in many types to correspond to the multiple scenes in the applications software, and is supplied together with the applications software. The transparent seal 33 may be made of, for example, an optically transparent film made of synthetic resin such as polyester. However, the present invention is not limited thereto.

Thus a large amount of information can be displayed on portable game machine 30 since auxiliary information such as menu options and icons as well as the images displayed by reflective liquid crystal panel 6 can be displayed on display unit 31. And because transparent seal 33 is easily detachable, this transparent seal 33 can be simply detached and attached in accordance with the applications software used in portable game machine 30. And a variety of scenes can be put together in portable game machine 30 by replacing transparent seal 33, even within the same applications software.

Yet another embodiment of the above portable game machine will be described in detail with reference to FIGS. 10 through 12

Fourth Embodiment

Figure 10:
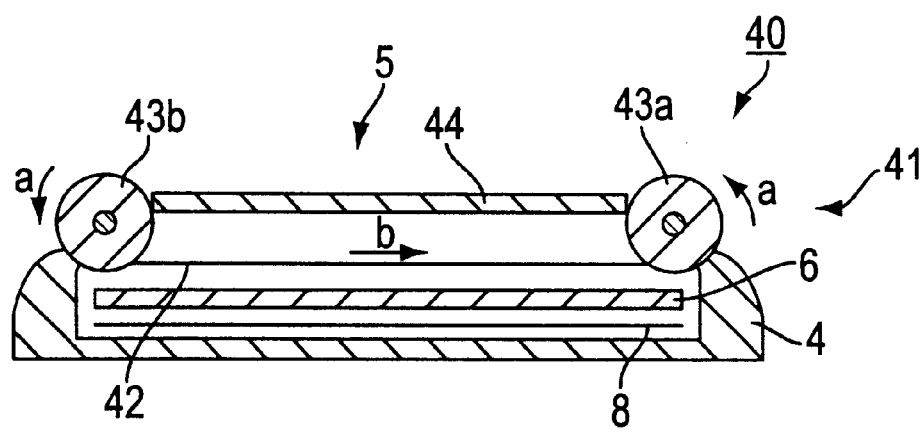
FIG. 10 is a cross-sectional view of the display unit in a portable game machine that according to a fourth embodiment of this invention.
Figure 11:
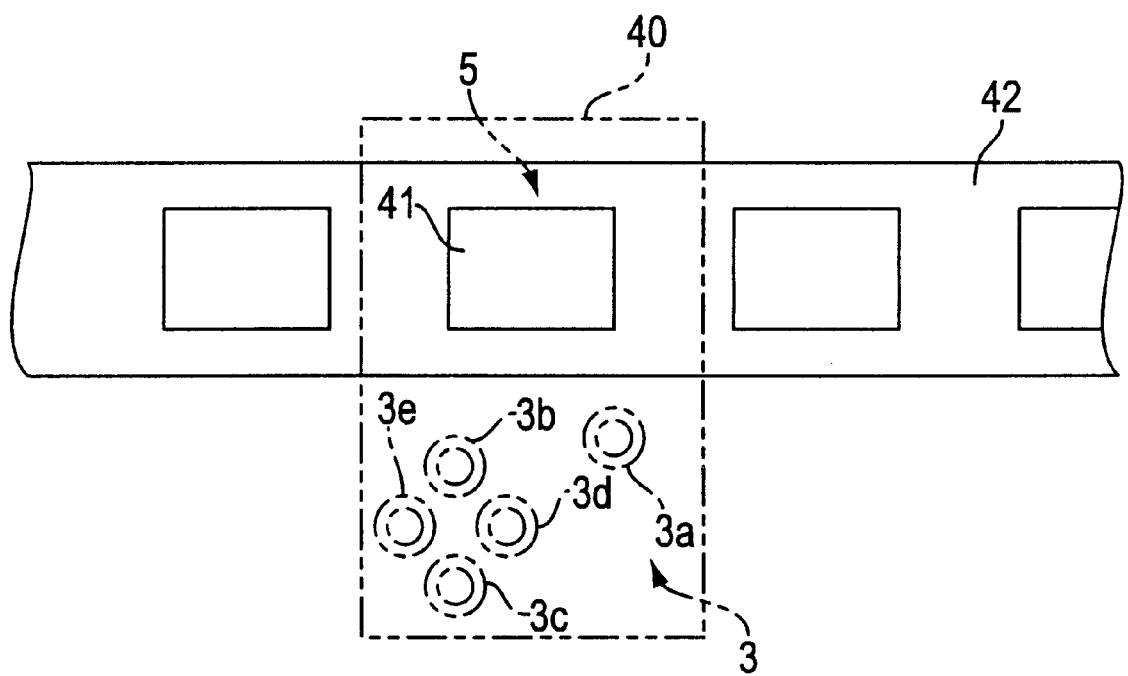
FIG. 11 is an explanatory diagram that shows how auxiliary information that corresponds to the multiple display units are depicted on the transparent film of the portable game machine, along its longitudinal direction.
Figure 12:
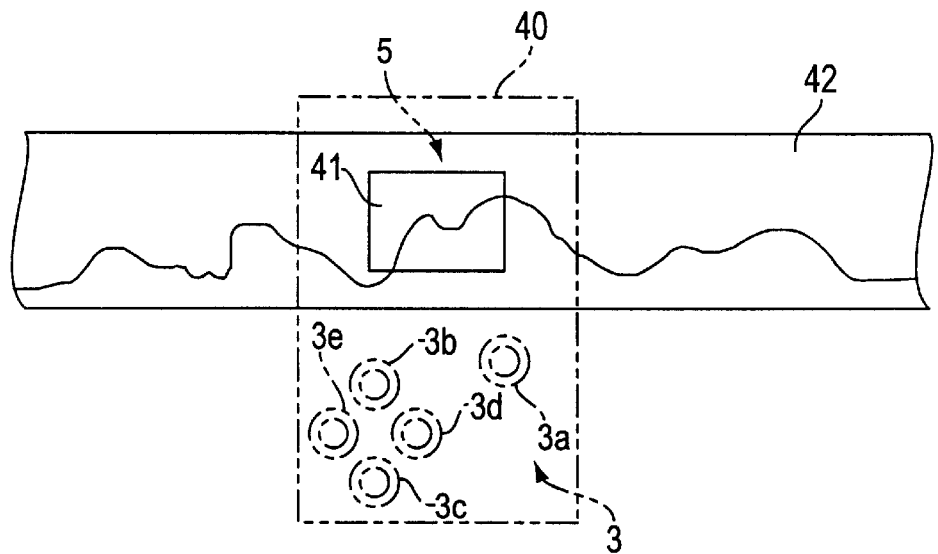
FIG. 12 is an explanatory diagram that shows how auxiliary information that corresponds to the multiple display units and changes continuously are depicted on the transparent film of the portable game machine, along its longitudinal direction.

A portable game machine 40 shown in FIGS. 10 through 12 as the fourth embodiment has the same configuration as that of portable game machine 1 shown in FIGS. 1 through 6, and is characterized in that it has a transparent film in the shape of a strip. Therefore the same symbols are used for the same composition as in portable game machine 1 shown above in FIGS. 1 through 6, and a detailed explanation is omitted.

As shown in FIG. 10, portable game machine 40 has a display unit 41, which has reflective liquid crystal panel 6, which is a display means, base panel 8, a transparent panel or film 42, which is the substrate of the auxiliary information display means and consists of a flexible sheet in the shape of a strip, reels 43a and 43b, which are auxiliary information changing means on which this transparent film 42 is wound and which scroll transparent film by winding up transparent film 42, and a transparent cover 44, which is a transparent panel. These parts are constructed so that they can be attached to and detached from portable game machine 40. That is, portable game machine 40 consists of display unit 41, in which transparent film 42, reels 43a and 43b, and transparent cover 44, which are unitized as a cartridge, are inserted into the front of reflective liquid crystal panel 6, which is supported in housing 4, and transparent film 42 and transparent cover 44, reflective liquid crystal panel 6, and base panel 8 are positioned in display window 5. Also, transparent cover 44 may be installed in housing 4 with being preset in display window 5, and it may be made detachable, as described in the composition described in the first and second embodiments. Base panel 8, like reflective liquid crystal panel 6, may be preinstalled on housing 4, and it may be constructed so as to be detachable, as described in the first embodiment.

In portable game machine 40, menu options, icons, and other auxiliary information, or background pictures, are depicted on transparent film 42 and, as necessary, on the base panel 8 or transparent cover 44, and by manipulating operation unit 3, arrow 6c, etc. displayed on reflective liquid crystal panel 6 shown in FIG. 3 is moved to indicate auxiliary information.

On transparent film 42, multiple panels of auxiliary information whose amount corresponds to multiple display windows 5 are depicted as shown in FIG. 11, or a picture that, for example, changes continuously is depicted as auxiliary information as shown in FIG. 12. That is, auxiliary information corresponding to multiple scenes is depicted on transparent film 42. In portable game machine 40, as shown in FIG. 10, by rotating reels 43a and 43b in the direction of for example, arrows a, transparent film 42 wound on reel 43b is scrolled in direction indicated by arrow b, and transparent film 42 fed is wound up by reel 43b. By doing so, in portable game machine 40, one can appropriately change the auxiliary information that is shown by transparent film 42 in display unit 41.

Thus a large amount of information can be displayed on portable game machine 40 since auxiliary information such as menu options and icons as well as the images displayed by reflective liquid crystal panel 6 can be displayed on display unit 41. And the auxiliary information displayed in display unit 41 can be appropriately changed by scrolling transparent film 42. Moreover, because transparent film 42, reels 43a and 43b, and transparent cover 44, etc. are easily detachable, these parts can be simply detached and attached in accordance with the applications software used in portable game machine 40. And a variety of scenes can be put together in portable game machine 40 by replacing transparent film 42, reels 43a and 43b, and transparent cover 44, etc., even within the same applications software.

Yet another embodiment of the above portable game machine will be described in detail with reference to FIG. 13.

Fifth Embodiment

Figure 13:
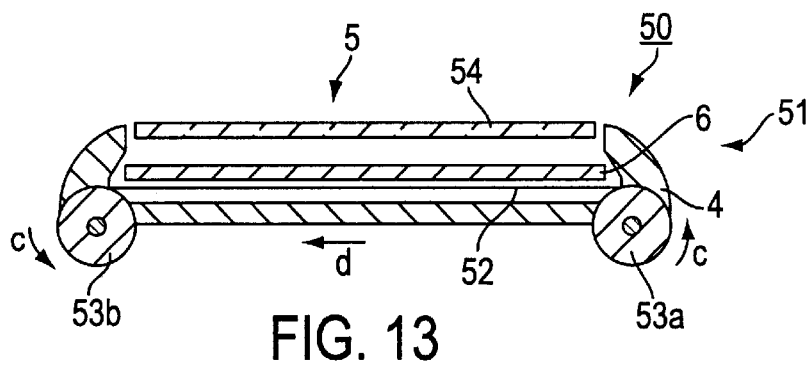
FIG. 13 is a cross-sectional view of the display unit in a portable game machine according to a fifth embodiment of this invention.

A portable game machine 50 shown in FIG. 13 as the fifth embodiment has the same basic configuration as that of portable game machine 40 shown in FIGS. 10 through 12, and is characterized in that a reel mechanism is applied to its strip-shaped base film. Therefore the same symbols are used for the same composition as in portable game machine 40 shown above in FIGS. 10 through 12, and a detailed explanation is omitted.

As shown in FIG. 13, portable game machine 50 has a display unit 51, which has reflective liquid crystal panel 6, which is a display means, a base film 52, which is the substrate of the auxiliary information display means and consists of a flexible sheet in the shape of a strip, reels 53a and 53b, which are auxiliary information changing means on which the base film 52 is wound and which scroll base film 52 by winding up base film 52, and a transparent cover 54, which is of a transparent panel. The composition is such that these parts are detachably attached to portable game machine 50. That is, portable game machine 50 has roughly the same composition as described in the fourth embodiment and consists of display unit 51, in which base film 52 and reels 53a and 53b, which are unitized as a cartridge, are inserted into the back of reflective liquid crystal panel 6, which is supported in housing 4, and this base film 52 and reflective liquid crystal panel 6, base panel 8, and transparent cover 54 are positioned in display window 5 and are covered by housing 4. Transparent cover 54 may be installed in housing 4 with being preset in display window 5. Also, transparent cover 54 may be made so that it is inserted by sliding, as described in the first embodiment, or it may be made so that it is detachable, as in the composition shown in the second embodiment.

In portable game machine 50, auxiliary information such as menu options or icons, or background pictures, are depicted on base film 52 and, as necessary, on transparent cover 54, and by manipulating operation unit 3, arrow 6c, etc. displayed on reflective liquid crystal panel 6 shown in FIG. 3 is moved to indicate auxiliary information.

Auxiliary information or background pictures corresponding to multiple scenes are depicted on base film 52, as on the base film 52 shown in the fourth embodiment. In portable game machine 50, by for example rotating reels 53a and 53b in the direction of arrow c, base film 52 that is wound on reel 53a is scrolled in the direction of arrow d and this base film 52 is wound onto reel 53b. In this way, in portable game machine 50, the auxiliary information or background pictures shown on base film 52 in display unit 51 can be changed appropriately.

Thus in portable game machine 50, auxiliary information such as menu options and icons can be displayed in display unit 51 as well as the images displayed by reflective liquid crystal panel 6, and a large amount of information can be displayed even in a display unit 51 that has a small, low-resolution reflective liquid crystal panel 6. And the auxiliary information or background pictures displayed in display unit 51 can be appropriately changed by scrolling base film 52. Moreover, because base film 52, reels 53a and 53b, and transparent cover 54, etc. are easily detachable, these parts can be used with being simply detached and attached in accordance with the applications software used in portable game machine 50. And a variety of scenes can be put together in portable game machine 50 by replacing base film 52, reels 53a and 53b, and transparent cover 54, etc., even within the same applications software.

Yet another embodiment of the above portable game machine will be described with reference to FIGS. 14 and 15.

Sixth Embodiment

Figure 14:
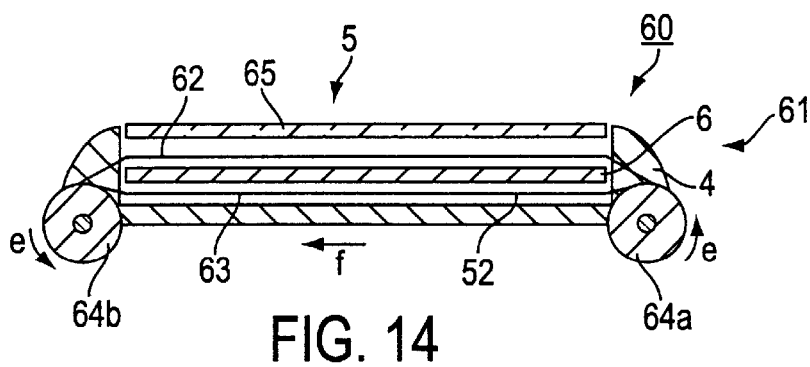
FIG. 14 is a cross-sectional view of the display unit in a portable game machine according to a sixth embodiment of this invention.
Figure 15:
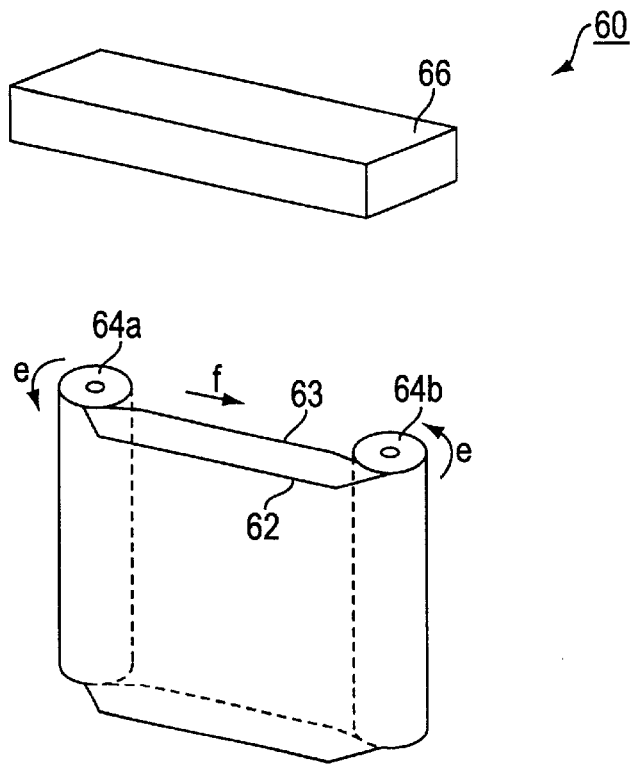
FIG. 15 is an exploded perspective view of the portable game machine.
Figure 15:
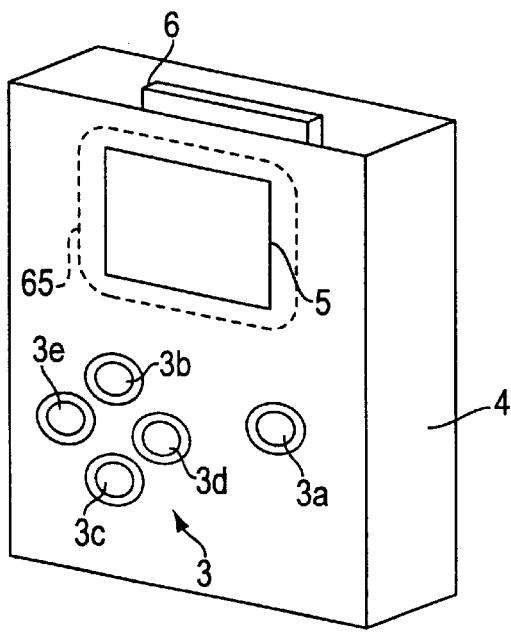

A portable game machine 60 shown. in FIGS. 14 and 15 as the sixth embodiment has the same basic configuration as that of portable game machine 40 shown in FIGS. 10 through 12, and is characterized in that a reel mechanism is applied to both its strip-shaped transparent film and base film. Therefore the same symbols are used for the same composition as in portable game machine 40 shown above in FIGS. 10 through 12, and a detailed explanation thereof is omitted.

As shown in FIG. 14, portable game machine 60 has a display unit 61, which has reflective liquid crystal panel 6, which is a display means, a transparent film 62 and a base film 63, which are the substrate of the auxiliary information display means and consist of flexible sheets in the shape of a strip, reels 64a and 64b, which are auxiliary information changing means on which these transparent film 62 and base film 63 are wound and which scroll transparent film 62 and base film 63 by winding up transparent film 62 and base film 63, and a transparent cover 65, which consists of a transparent panel. The configuration is such that these parts are detachably attached to portable game machine 60.

That is, in portable game machine 60, as shown in FIG. 15, transparent film 62, base film 63, and reels 64a and 64b are unitized as a cartridge, and these parts are inserted into portable game machine 60 so that transparent film 62 is positioned on the front surface of reflective liquid crystal panel 6 supported in housing 4, and base film 63 is positioned on the back surface thereof. At this time, of course, reflective liquid crystal panel 6, transparent film 62, and base film 63 are positioned in display window 5. Thus portable game machine 60 is composed so that reflective liquid crystal panel 6 lies between transparent film 62 and base film 63, and is used with being covered by upper cover 66, which is of cap shape, for example. Transparent cover 65 is installed in housing 4 with being preset in display unit 61. Like reflective liquid crystal panel 6, this transparent cover 65 may be preinstalled and supported by housing 4, and may be made detachable, as shown in the first or second embodiment.

Typically, transparent cover 65 consists of a transparent synthetic resin such as acrylic, as in transparent panel 7 shown in FIG. 1, for example. Typically, an optical transparent film made of synthetic resin such as polyester, for example, is used as the transparent film 62. However, the present invention is not limited thereto.

In portable game machine 60, menu options, icons, and other auxiliary information, or background pictures, are depicted on transparent film 62 and base film 63, or, as necessary, on transparent cover 65, and by manipulating operation unit 3, arrow 6c, etc. displayed on reflective liquid crystal panel 6 shown in FIG. 3 is moved to indicate auxiliary information.

Auxiliary information and background pictures corresponding to multiple scenes are depicted on transparent film 62 and base film 63, and in portable game machine 60, by rotating reels 64a and 64b in the direction of, for example, arrows e, transparent film 62 and base film 63 wound on reel 64a are scrolled in direction indicated by arrow f, and these transparent film 62 and base film 63 are wound up by reel 64b. By doing so, in portable game machine 60, one can appropriately change the auxiliary information and background pictures that are shown by transparent film 62 and base film 63 in display unit 61.

Thus in portable game machine 60, auxiliary information such as menu options and icons can be displayed in display unit 61 as well as the images displayed by reflective liquid crystal panel 6, and a large amount of information can be displayed even in a display unit 61 that has a reflective liquid crystal panel 6 of small screen size and low resolution. And the auxiliary information or background pictures displayed in display unit 61 can be appropriately changed by scrolling transparent film 62 and base film 63. Moreover, in portable game machine 60, because transparent film 62, base film 63, reels 64a and 64b, and transparent cover 65, etc. are easily detachable, these parts can be used with being simply detached and attached in accordance with the applications software used. And a variety of scenes can be put together in portable game machine 60 by replacing transparent film 62 or base film 63, reels 64a and 64b, and transparent cover 65, etc., even within the same applications software.

As described above, in a portable game machine shown as an embodiment of this invention, even if the display means has a small display area and low resolution, menu options, icons, and other auxiliary information can be displayed as well as the images displayed on the display means, and a sufficient quantity of information can be displayed. In the portable game machine, the mechanism that displays the auxiliary information is easily detachable from the main unit, making it possible to change the auxiliary information in accordance with the state in which this mechanism is installed. Therefore in the portable game machine the desired auxiliary information can easily be displayed in accordance with the applications software to be used, and various displays are possible even within the same applications software.

The embodiments of the present invention are not limited to the above-described configuration and have been described using a reflective liquid crystal panel as the display means, but they may be suitably modified to, for example, a plasma image display device. Various mechanisms may be applied for the mechanism that scrolls the transparent film or base film, such as a mechanism by which a dial, etc. not shown is turned by hand and the rotation is linked to this rotation, or a mechanism in which rotation is done by a motor, etc. not shown. Moreover, such a mechanism that causes the transparent film or base film to move need not do so by scrolling; it suffices that it merely be possible to arbitrarily change the panel that is displayed. The auxiliary information that is depicted on the transparent panel, transparent film, or base film, etc. is not limited to printed auxiliary information; the auxiliary information display means may be made using any method, so long as the relevant information can be shown, such as etching by chemicals or dyeing. Needless to say, other modifications are also allowed, so long as they do not deviate from the purport of this invention.

As described in detail above, the electronic equipment of the present invention has a display means to display information, an auxiliary information display means on which information that is auxiliary to the information displayed on this display means is depicted on a substrate, and a display window in which there are simultaneously displayed, in a superimposed state, the information displayed on the display means and the auxiliary information that is displayed on the auxiliary information display means, and the auxiliary information display means is constructed so that at least the substrate on which the auxiliary information is depicted is movable.

Thus in the electronic equipment of the present invention, even if the display means has a small display area and low resolution, menu options, icons, and other auxiliary information, as well as the images displayed on the display means, can be displayed at will in the display window, and a sufficient quantity of information can be displayed.

Also, the auxiliary information display device of the present invention has an auxiliary information display layer that is positioned inside the electronic equipment's display window and in which auxiliary information of the information that is displayed on the display means of the electronic equipment is depicted on a substrate, and at least the auxiliary information display layer is movable.

Thus in the auxiliary information display device of this invention, even if the display means of the electronic equipment has a small display area and low resolution, in addition to the image displayed on the display means, auxiliary information including arbitrary menu options or icons can be displayed in the display window of the electronic equipment, and a sufficient quantity of information can be displayed.

This invention makes it possible to provide electronic equipment that can process data with an attached mechanism to display in an auxiliary way such marks as icons, as well as an auxiliary information display device attached to the electronic equipment.

What is claimed is:

1. Electronic equipment comprising:
   a display means to display information;
   an auxiliary information display means in which auxiliary information of the information that is displayed on said display means is depicted on a substrate; and
   a display window in which information displayed by said display means and auxiliary information shown in said auxiliary information display means are displayed simultaneously and positioned in a superimposed state,
   wherein said auxiliary information display means is configured so that said substrate is slidable on the display means so as to select a desired content of said auxiliary information displayed on said display window.

2. Electronic equipment as described in claim 1, wherein said auxiliary information display means is attached so as to be freely detachable from the electronic equipment.

3. Electronic equipment as described in claim 1, wherein said substrate of said auxiliary information display means is a strip-shaped flexible sheet on which there are depicted auxiliary information corresponding to said multiple display windows, and has an auxiliary information change means that changes the auxiliary information that is displayed in said display window by moving said substrate in the longitudinal direction.

4. Electronic equipment as described in claim 1, wherein said auxiliary information display is one formed of an optically transparent panel or a flexible sheet on which auxiliary information is depicted.

5. Electronic equipment as described in claim 1, wherein said substrate is attached to one of the front and the back of said display means.

6. An auxiliary information display device comprising:
   an auxiliary information display layer that is positioned in a display window of an electronic equipment; and
   a substrate on which auxiliary information of the information that is displayed in a display means of the electronic equipment is depicted on a substrate;
   wherein said substrate is laterally moved so as to select a desired content of said auxiliary information to be displayed in the display window.

7. An auxiliary information display device as described in claim 6, wherein said auxiliary information display layer is attached to the electronic equipment so as to be freely detachable therefrom.

8. An auxiliary information display device as described in claim 6, wherein
   said auxiliary information display layer is a strip-shaped flexible sheet, and auxiliary information corresponding to multiple display windows of the electronic equipment is depicted on said substrate, and
   there is provided an auxiliary information change means that changes the auxiliary information that is displayed in said display window by moving said auxiliary information display layer in the longitudinal direction.

9. An auxiliary information display device as described in claim 6, wherein said auxiliary information display layer is one formed of an optically transparent panel or flexible sheet on which said auxiliary information is depicted.

10. An auxiliary information display device as described in claim 6, wherein said auxiliary information display layer is positioned to the front or back of said electronic equipment.

11. A portable game machine having display means that displays the game comprising:
    auxiliary information display means provided on one of the front, back, and both the front and back of said display means;
    wherein an image on said display means and a display content of said auxiliary information display means are combined, and
    wherein said auxiliary information display means is slidable on the display means so as to select a desired display content from the display content of said auxiliary information display means.

12. A portable game machine as described in claim 11, wherein said display means is a reflective liquid crystal panel.

13. A portable game machine as described in claim 11, wherein
    said display means displays mainly characters, and
    said auxiliary information display means displays one of menus, icons, and background scenes.

14. A portable game machine as described in claim 11, wherein said auxiliary information display means is such that auxiliary information is depicted on optically transparent members positioned in front of said display means.

15. A portable game machine as described in claim 14, wherein said auxiliary information display means is a rigid, optically transparent member and is replaceably assembled into the front of said display means.

16. A portable game machine as described in claim 14, wherein said auxiliary information display means consists of an optically transparent rigid member and a flexible sheet positioned on the front or back of said rigid member, and auxiliary information is depicted on one of said rigid member and said flexible sheet and both said rigid member and said flexible sheet.

17. A portable game machine as described in claim 15, wherein said flexible sheet is removable.

18. A portable game machine as described in claim 15, wherein said flexible sheet is movable and has a film shape on which multiple types of auxiliary information is depicted.

19. A portable game machine as described in claim 11, wherein said auxiliary information display means is a base panel that is positioned in back of said display means and has an optically reflective function, and auxiliary information is depicted on said base panel.

20. A portable game machine as described in claim 19, wherein said reflection panel is movable.

* * * * *